US010044533B2

(12) United States Patent
Esch et al.

(10) Patent No.: US 10,044,533 B2
(45) Date of Patent: Aug. 7, 2018

(54) METHOD AND DEVICE FOR CANCELING A BIAS OF A RADIO CHANNEL SEQUENCE

(71) Applicant: Intel IP Corporation, Santa Clara, CA (US)

(72) Inventors: Thomas Esch, Kaarst (DE); Edgar Bolinth, Korschenbroich (DE); Markus Jordan, Gelsenkirchen (DE); Tobias Scholand, Duisburg (DE); Michael Speth, Krefeld (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/993,157

(22) Filed: Jan. 12, 2016

(65) Prior Publication Data

US 2016/0248612 A1 Aug. 25, 2016

(30) Foreign Application Priority Data

Feb. 24, 2015 (DE) .................. 10 2015 102 605

(51) Int. Cl.
| H04L 25/06 | (2006.01) |
| H04L 27/38 | (2006.01) |
| H04B 1/7107 | (2011.01) |
| H04J 13/00 | (2011.01) |
| H04J 3/06 | (2006.01) |

(52) U.S. Cl.
CPC .......... *H04L 25/06* (2013.01); *H04B 1/7107* (2013.01); *H04J 3/0602* (2013.01); *H04J 13/004* (2013.01); *H04L 27/3818* (2013.01)

(58) Field of Classification Search
CPC ... H04B 1/7107; H04L 25/06; H04L 27/3818; H04J 3/0602; H04J 13/004
See application file for complete search history.

(56) References Cited

U.S. PATENT DOCUMENTS

| 5,812,972 A * | 9/1998 | Juang ................. G10L 15/04 704/234 |
| 5,894,473 A | 4/1999 | Dent |
| 5,894,474 A | 4/1999 | Maison et al. |
| 2002/0051434 A1 | 5/2002 | Ozluturk et al. |

(Continued)

OTHER PUBLICATIONS

F. Vanhaverbeke, et al. "Increasing CDMA Capacity Using Multiple Orthogonal Spreading Sequence Sets and Successive Interference Cancellation", 2002 IEEE p. 1516-1520.

(Continued)

*Primary Examiner* — David B. Lugo
(74) *Attorney, Agent, or Firm* — Schiff Hardin LLP

(57) ABSTRACT

A method (200) of bias cancellation for a radio channel sequence includes: receiving (201) a radio signal, the radio signal comprising a radio channel sequence coded by a first signature, the first signature belonging to a set of orthogonal signatures; decoding (202) the radio channel sequence based on the first signature to generate a decoded radio channel sequence; decoding (203) the radio channel sequence based on a second signature, wherein the second signature is orthogonal to the signatures of the set of orthogonal signatures, to generate a bias of the radio channel sequence; and canceling (204) the bias of the radio channel sequence from the decoded radio channel sequence.

20 Claims, 8 Drawing Sheets

(56) References Cited

U.S. PATENT DOCUMENTS

| | | | |
|---|---|---|---|
| 2003/0179821 A1* | 9/2003 | Lusky | H04L 1/0001 |
| | | | 375/224 |
| 2005/0163196 A1 | 7/2005 | Currivan et al. | |
| 2007/0297497 A1* | 12/2007 | Seibert | H04B 1/7107 |
| | | | 375/148 |
| 2008/0267303 A1* | 10/2008 | Baldemair | H04B 1/7075 |
| | | | 375/260 |
| 2009/0036155 A1* | 2/2009 | Wu | H04W 52/286 |
| | | | 455/522 |
| 2011/0021170 A1* | 1/2011 | Kolze | H04L 25/03019 |
| | | | 455/296 |
| 2011/0032837 A1* | 2/2011 | Luschi | H04B 17/318 |
| | | | 370/252 |
| 2012/0281574 A1 | 11/2012 | Pham et al. | |

OTHER PUBLICATIONS

Office Action dated Feb. 2, 2017 for Taiwan Patent Application No. 105101721.

\* cited by examiner

300

| r0 | r1 | r2 | r3 | r4 | ... | ... | r37 | r38 | r39 |

+ + + +

| b0 | b1 | b2 | b3 |

= = = =

| r'0 | r'1 | r'2 | r'3 | r4 | ... | ... | r37 | r38 | r39 |

* * * *

| s0 | s1 | s2 | s3 | s4 | ... | ... | s37 | s38 | s39 |

= = = =

| s0(r0+b0) | s1(r1+b1) | s2(r2+b2) | s3(r3+b3) | s4*r4 | ... | ... | s37*r37 | s38*r38 | s39*r39 |

Fig. 3

METHOD AND DEVICE FOR CANCELING A BIAS OF A RADIO CHANNEL SEQUENCE

FIELD

The disclosure relates to methods and devices for canceling a bias of a radio channel sequence, in particular with respect to Synchronization Channel (SCH)-bias cancellation for Enhanced Dedicated Channel Relative Grant Channel (E-RGCH) and/or Enhanced Dedicated Channel Hybrid Automatic Repeat Request Indicator Channel (E-HICH) radio channels.

BACKGROUND

Signals transmitted between components of a radio communication network such as a base station and a mobile terminal may include different kinds of unwanted signal components which can disturb receiver performance. At cell center very low other cell interference is present. In such scenarios the inter chip/symbol interference introduced by the mobile channel's delay spread and the own cell's SCH (Synchronization Channel), such as P-SCH and S-SCH which are non-orthogonal to the desired OVSF (Orthogonal Variable Spreading Factor Code) spread signals are the main disturbances to the mobile receiver, for example the 3G Rel.99 receiver. In fact, only low delay spread channels having a strong first tap are expected for such high SINR (Signal to Interference and Noise) conditions such that the own cell's SCH 102 is the main disturbance to the mobile receiver.

When decoding the Enhanced Dedicated Channel Relative Grant Channel (E-RGCH), the non-orthogonal SCH introduces an additive bias which can lead to false decisions (false UPs/DOWNs, missed UPs/DOWNs). The magnitude of this bias depends on a number of PHY parameters, like SCH-power, PSC, P-SCH, S-SCH, E-RGCH/E-HICH OVSF code, E-RGCH/E-HICH signature sequence index. E-RGCH issues with the mentioned problem are known from field and lab tests.

Methods and devices employed in wireless communication networks constantly have to be improved. In particular, it may be desirable to improve the detection rate of the mobile receiver in situations as described above.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

FIG. 3 is a schematic diagram of a decoding scheme 300 for decoding a radio channel sequence in accordance with the disclosure.

DETAILED DESCRIPTION

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

The methods and devices described herein may be based on radio channel sequences, orthogonal signatures and bias cancellation. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on UMTS (Universal Mobile Telecommunications System) and 3GPP (3$^{rd}$ Generation Partnership Project) systems. The methods and devices described below may further be implemented in a mobile device (or mobile station or User Equipment (UE)) or a base station (NodeB, eNodeB). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to about 300 GHz. The frequency range may correspond to frequencies of alternating current electrical signals used to produce and detect radio waves.

This disclosure describes a method and device to estimate and cancel the bias caused by a synchronization signal such as SCH in order to improve signal reception, in particular the E-RGCH reception. As the E-HICH uses the same transport channel and (de-)coding mechanism as the E-RGCH, the same bias cancellation principle can be applied to E-HICH and other similar structured signals.

Figure 1:
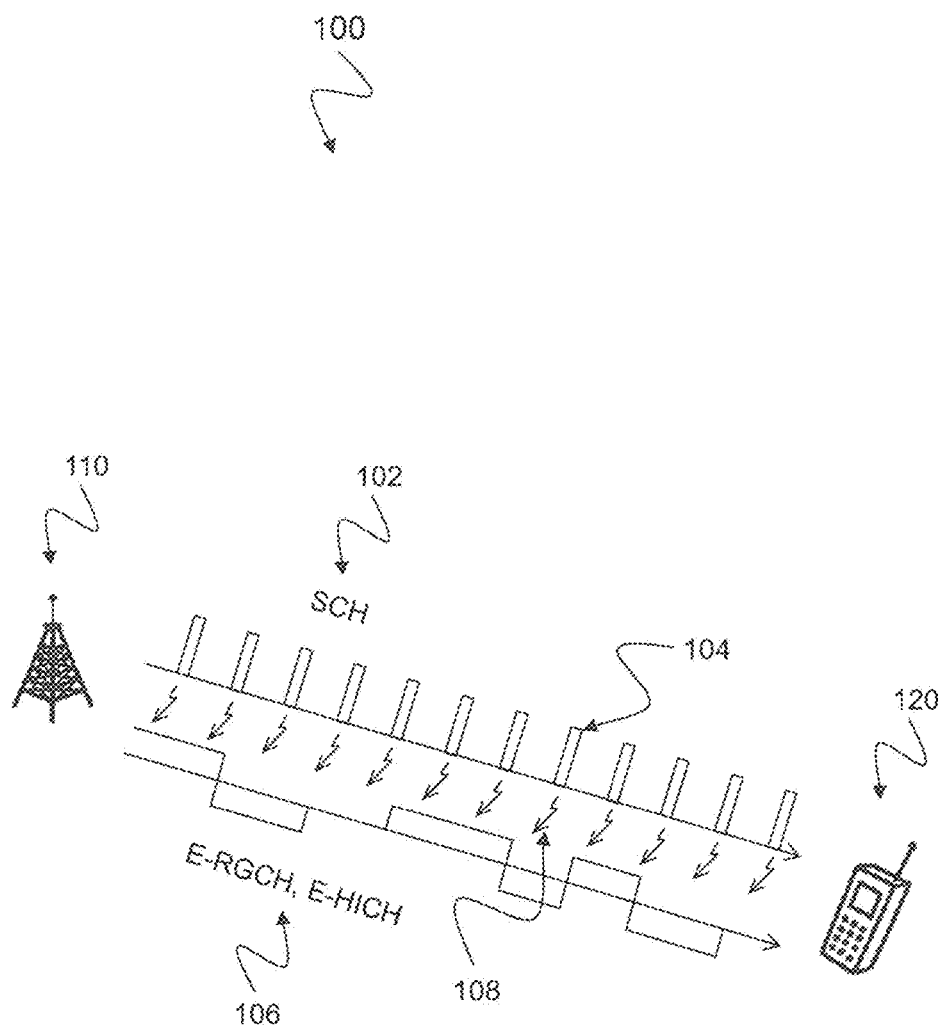
FIG. 1 is a schematic diagram of a radio communication network 100 including a base station 110 and a mobile terminal 120.

FIG. 1 is a schematic diagram of a radio communication network 100 including a base station 110 and a mobile terminal 120. In radio communication between a base station 110 and a UE 120 a transmit signal 106, e.g. an E-RGCH or an E-HICH signal is transmitted by the base station 110 together with a synchronization signal 102, e.g. a SCH signal. The synchronization signal 102 includes synchronization sections 104 including a synchronization sequence together with sections of no signal activity. During the synchronization sections that may be periodic the transmit signal 106 experiences distortions 108 resulting in unwanted bias of the decoded signal received at the mobile terminal 120.

It may be easy to measure the additive SCH bias if it would be known in advance what decision was actually transmitted (UP/HOLD/DOWN) on the E-RGCH in the current subframe. However, this information is of course not available for none of the set of (e.g. 40) orthogonal E-RGCH/E-HICH signature sequences.

The basic idea of this disclosure is to decode the E-RGCH with an additional (special) sequence which is orthogonal to the other (e.g. 40) sequences. As this special sequence is not defined in the standard (3GPP TS 25.211 Chapter 5.3.2.4, Version V9.2.0, September 2010), it can be ensured that it is not used for any transmission. Exploiting this fact, the SCH bias can be effectively estimated based on the decoded signal with this special sequence and canceled afterwards on the actual decoded E-RGCH.

Figure 2:
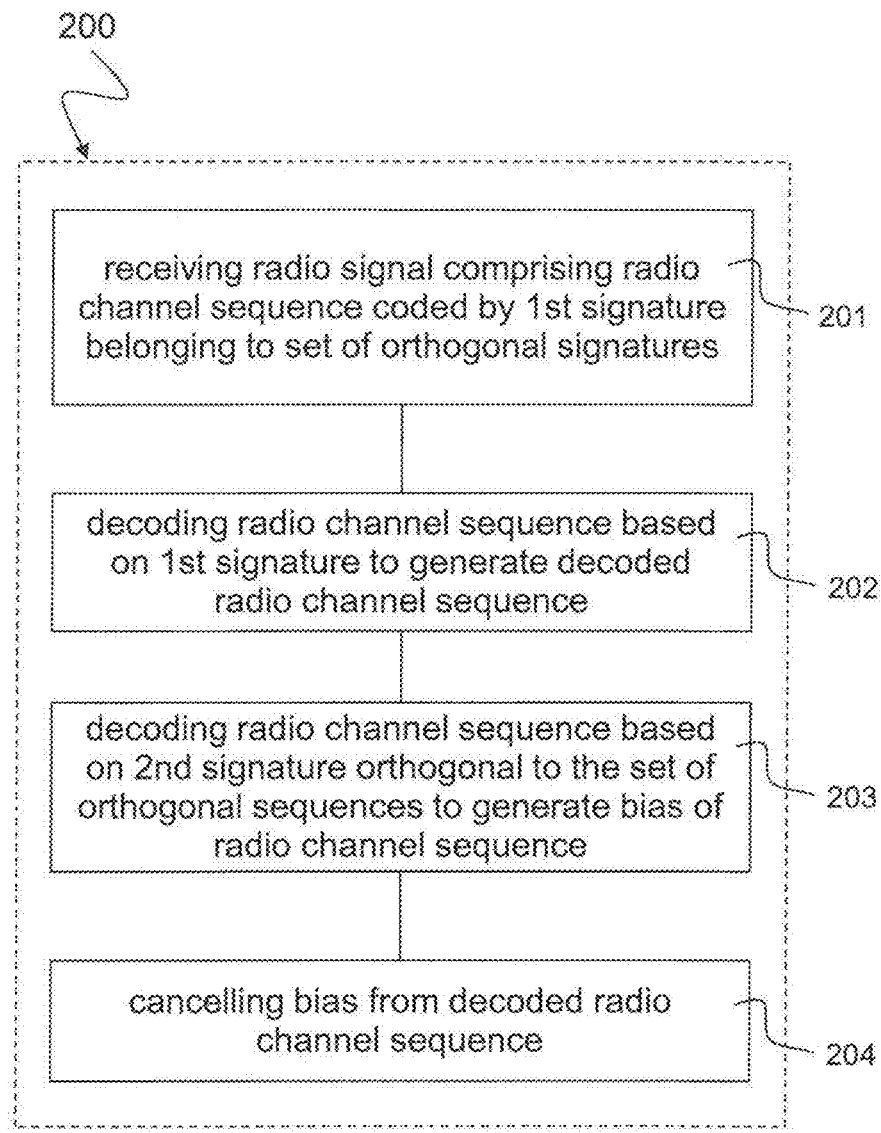
FIG. 2 is a schematic diagram of a method 200 of bias cancellation for a radio channel sequence in accordance with the disclosure.

FIG. 2 is a schematic diagram of a method 200 of bias cancellation for a radio channel sequence in accordance with the disclosure.

The method 200 includes receiving 201 a radio signal, the radio signal comprising a radio channel sequence coded by a first signature, the first signature belonging to a set of orthogonal signatures. The method 200 includes decoding 202 the radio channel sequence based on the first signature to generate a decoded radio channel sequence. The method 200 includes decoding 203 the radio channel sequence based on a second signature, which second signature is orthogonal to the signatures of the set of orthogonal signatures, to generate a bias of the radio channel sequence. The method 200 includes canceling 204 the bias of the radio channel sequence from the decoded radio channel sequence. The decoding may be performed for example as described below with respect to FIG. 3. The orthogonal signatures of the set of orthogonal signatures may be structured for example as described below with respect to FIG. 4. The second signature may be determined for example as described below with respect to FIG. 5 or FIG. 6.

The radio channel sequence may be an E-RGCH mobile channel. The radio channel sequence may be an E-HICH mobile channel. The synchronization sequence may be an SCH mobile channel.

The second signature may be different from all signatures of the set of orthogonal signatures. The second signature may be different from signatures used for coding other radio channel sequences. The second signature may have a same length than the first signature. The second signature may have a same length than the radio channel sequence.

The second signature may include first sections corresponding to respective first sections of the radio channel sequence. The first sections of the second signature may be periodically arranged in the second signature and may have the same length. The second signature may include second sections, the second sections determined such that the second signature is orthogonal to all signatures of the set of orthogonal signatures. The second sections of the second signature may be periodically arranged in the second signature and have the same length. The second sections of the second signature may be contiguous with the first sections of the second signature.

The first sections of the second signature may be aligned with activity periods of a synchronization sequence comprised by the radio signal. The second sections of the second signature may be aligned with non-activity periods of the synchronization sequence.

FIG. 3 is a schematic diagram of an exemplary decoding scheme 300 for decoding a radio channel sequence in accordance with the disclosure.

On TX side, there is the superposition of all 40 encoded E-RGCH/E-HICH signature sequences $r_i$ ($i \in [0,39]$) in each slot. The SCH is active only in the first 256 chips of every slot. Therefore, only the first 4 E-RGCH/E-HICH samples (SF=128) are affected by an SCH bias $b_i$. On RX side, the received samples $[r'_0\ r'_1\ r'_2\ r'_3\ r_4 \ldots r_{39}]$ (with $r'_i = r_i + b_i$) are decoded by one specific E-RGCH signature sequences i and afterwards summed up. The result of this summation (in a noise-free scenario) is the actual transmitted E-RGCH decision $A = \text{amp} \ast d$ (where $d=+1$(UP), $d=0$(HOLD) or $d=-1$ (DOWN)) plus the corresponding SCH Bias $B_0 = s_0 \ast b_0 + s_1 \ast b_1 + s_2 \ast b_2 + s_3 \ast b_3$. This is illustrated in FIG. 3.

The decoding results in:

$$\sum_{i=0}^{3} r'_i \cdot s_i + \sum_{i=4}^{39} r_i \cdot s_i = A + B_0$$

Figure 4:
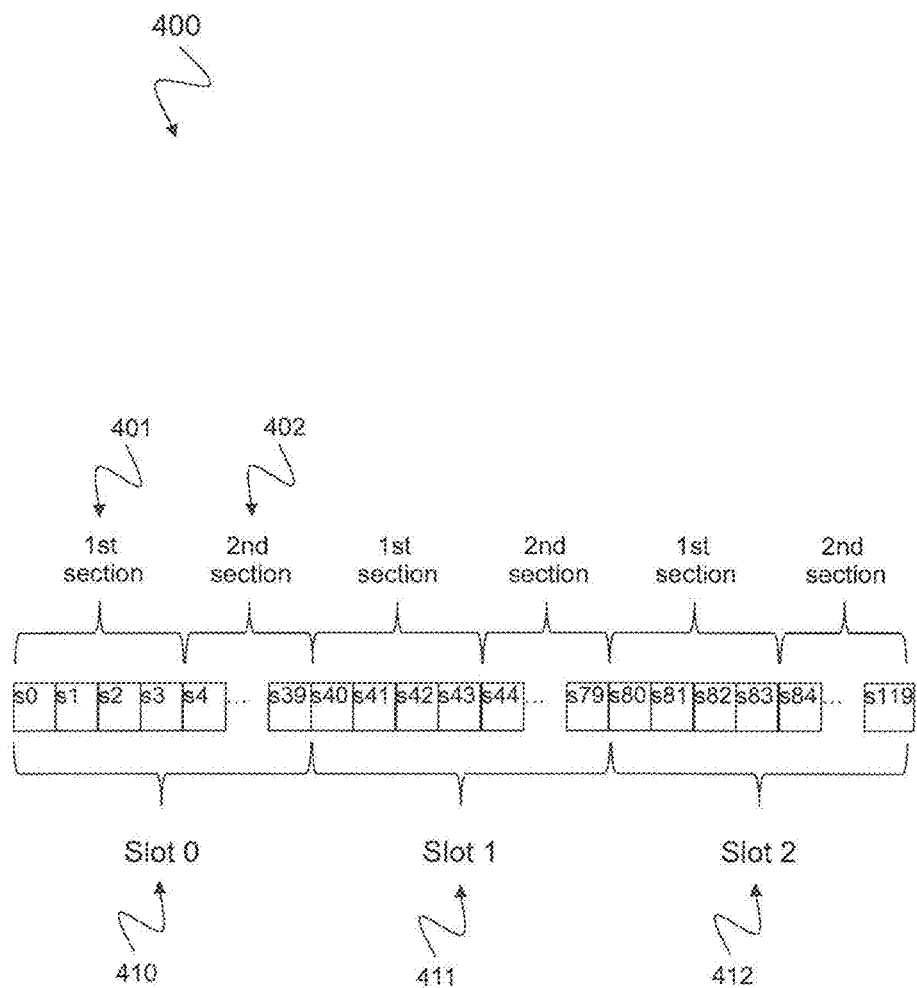
FIG. 4 is a schematic diagram of an exemplary orthogonal signature 400 in accordance with the disclosure.

FIG. 4 is a schematic diagram of an exemplary orthogonal signature 400 in accordance with the disclosure. The orthogonal signatures may be one slot long and may be extended to cover 2 ms by applying three signatures in a sequence over three consecutive slots, i.e. for each subframe there may be 40 orthogonal sequences of length 120 as depicted in FIG. 4.

The actual decision A may be the same in every slot of a subframe, i.e. summation over the complete subframe results in:

$$\sum_{i=0}^{3} r'_i \cdot s_i + \sum_{i=40}^{43} r'_i \cdot s_i + \sum_{i=80}^{83} r'_i \cdot s_i + \sum_{i=4}^{39} r_i \cdot s_i + \sum_{i=44}^{79} r_i \cdot s_i + \sum_{i=84}^{119} r_i \cdot s_i =$$
$$3A + B_0 + B_1 + B_2 = 3A + B$$

where $B_0$, $B_1$, $B_2$ are the respective SCH biases of Slot 0, 1 and 2. It is not known a priori what decision A is transmitted which makes it difficult to estimate the bias $B = B_0 + B_1 + B_2$.

The idea in this disclosure is to correlate an additional (special) sequence, in this example of length 120, with the received signal which has the following requirements:
Requirement 1:
The first 4 samples in each slot are the same as in the actual E-RGCH/E-HICH sequence which has been allocated to the UE for decoding, i.e. 0, 1, 2, 3 . . . 40, 41, 42, 43 . . . 80, 81, 82, 83 are the same as they determine the magnitude of the bias. The other 120-12=108 samples $\tilde{s}_i$ of the sequence can be chosen such that Requirement 2:

This special sequence is orthogonal to all other 40 sequences of length 120 defined in 3GPP TS 25.211 Chapter 5.3.2.4. There are several solutions possible to fulfill the second requirement as described in the following.

Figure 5:
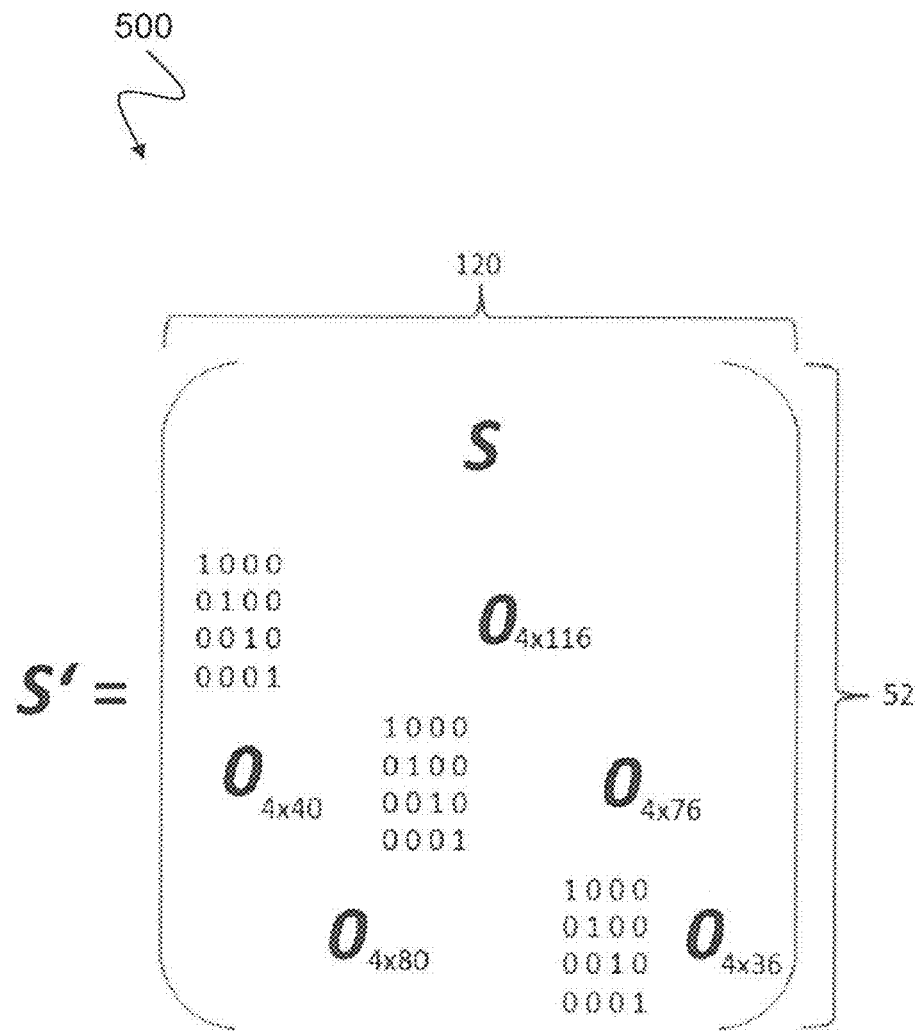
FIG. 5 is a diagram 500 of an exemplary extended signature matrix S' including a first signature matrix S in accordance with the disclosure.

FIG. 5 is a diagram 500 of an exemplary extended signature matrix S' including a first signature matrix S in accordance with the disclosure.

There are several solutions possible to fulfill the second requirement described above with respect to FIG. 4. One possibility is to find the special sequence based on a least-squares (LS) approach as follows: Let S be a 40-by-120 matrix containing all 40 original sequences of length 120 as defined in 3GPP TS 25.211 Chapter 5.3.2.4. This matrix S is extended to a new 52-by-120 matrix S' by adding 12 rows all containing just a single '1' at the first 4 positions of each slot as illustrated in FIG. 5, where $0_{m \times n}$ is an m-by-n matrix of zeros. According to the requirements stated above, the multiplication of this matrix S' with the desired (new) special sequence $\tilde{s}$ results in a vector $$b = (0_{1 \times 40}, s_0, s_1, s_2, s_3, s_{40}, s_{41}, s_{42}, s_{43}, s_{80}, s_{81}, s_{82}, s_{83})^T,$$

i.e.:

$$S' \cdot \tilde{s} = b.$$

The pseudo-inverse of S' solves this over-determined system in a LS sense providing the (new) special sequence according to:

$$\tilde{s} = pinv(S') \cdot b$$

As all of the 40 sequences suffer from a different bias after decoding (due to the different samples at the beginning of each slot), also 40 special sequences have to be found according to this way. Therefore, only the samples $s_0$, $s_1$, $s_2$, $s_3$, $s_{40}$, $s_{41}$, $s_{42}$, $s_{43}$, $s_{80}$, $s_{81}$, $s_{82}$, $s_{83}$ of the vector b have to be adapted depending on the original sequence. The 40 additional sequences can be determined in advance.

Next to the described LS approach, other solutions are possible. The additional degrees of freedom may, e.g., also be used to determine the additional 108 samples in a way such that they support the utilized arithmetic unit best (e.g., bipolar, unipolar, etc.).

Correlating the received E-RGCH signal with the respective special sequence $\tilde{s}$ directly results in an estimate of B as it can be ensured that nothing is transmitted via this additional sequence (A=0):

$$\sum_{i=0}^{3} r'_i \cdot s_i + \sum_{i=40}^{43} r'_i \cdot s_i + \sum_{i=80}^{83} r'_i \cdot s_i + \sum_{i=4}^{39} r_i \cdot \tilde{s}_i + \sum_{i=44}^{79} r_i \cdot \tilde{s}_i + \sum_{i=84}^{119} r_i \cdot \tilde{s}_i = \hat{B}$$

In a perfect noise-free system the result would be exactly the bias. Due to additional interferences in a real system however, it is a good estimate of the bias which can be subtracted from the actual decoded E-RGCH sequence to cancel the bias and to determine the decision A without bias. An additional temporal smoothing of the bias and/or applying additional orthogonal sequences (all fulfilling the above requirements) may be beneficial to reduce the variance of the estimation.

Methods and devices according to the disclosure separately correlate the received signal with two sequences, the original sequence, for example as defined in 3GPP TS 25.211 Chapter 5.3.2.4 and the special sequence as defined above. Afterwards, both correlation results may be subtracted to cancel out the bias and to estimate the actual decision A.

Mathematically, this is the same as subtracting both sequences at first and correlating the received signal only once with the difference of these two sequences afterwards. The result directly provides an estimate of the decision A without explicitly estimating the bias. As the first 4 samples in each slot of the original and the special sequence are the same (see above), the difference of both sequences is zero at those 12 positions simplifying the subsequent correlation. In this case, however, temporal smoothing of the bias may be not possible. Methods and devices according to the disclosure also provide such technique.

Figure 6:
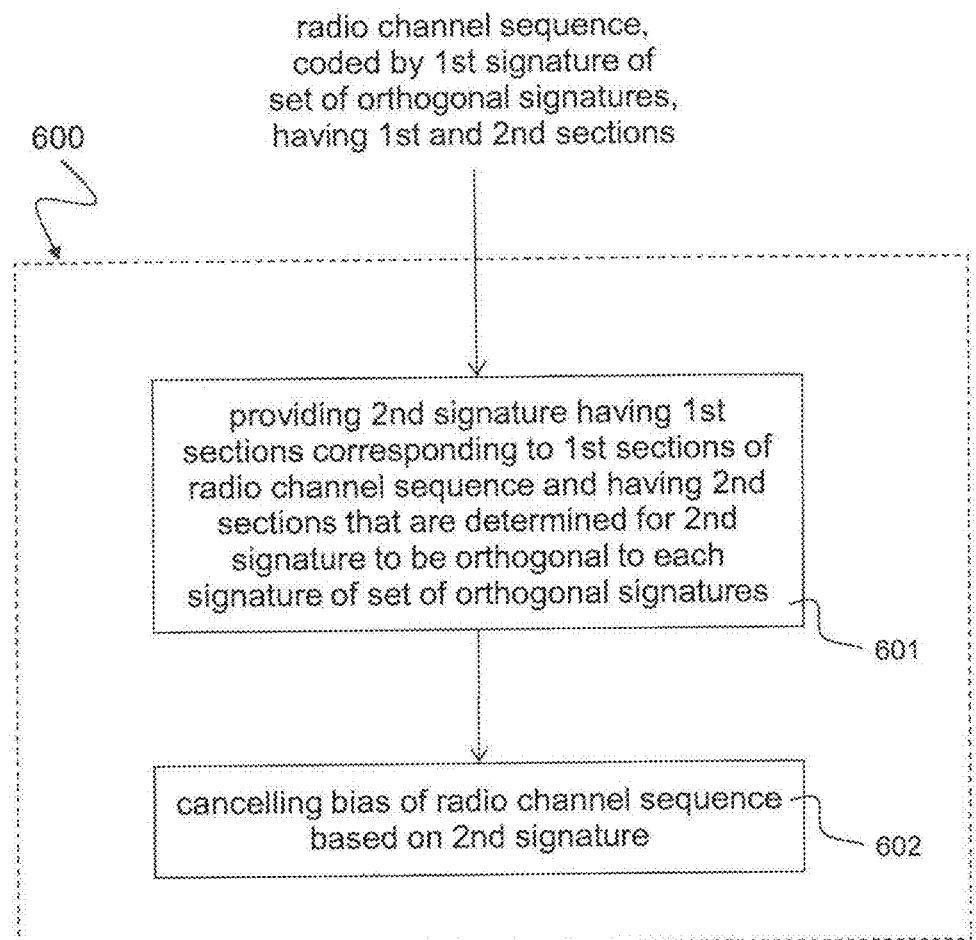
FIG. 6 is a schematic diagram of a method 600 for canceling a bias of a radio channel sequence in accordance with the disclosure.

FIG. 6 is a schematic diagram of a method 600 for canceling a bias of a radio channel sequence in accordance with the disclosure.

The radio channel sequence is coded by a first signature of a set of orthogonal signatures. The radio channel sequence includes a plurality of first sections and a plurality of second sections. The method 600 includes providing 601 a second signature comprising a plurality of first sections and a plurality of second sections, wherein the first sections of the second signature correspond to the first sections of the radio channel sequence and the second sections of the second signature are determined such that the second signature is orthogonal to each first signature of the set of orthogonal signatures. The method 600 includes Canceling 602 the bias of the radio channel sequence based on the second signature.

Determining the second signature may be performed as described above with respect to FIGS. 4 and 5.

The first sections of the radio channel sequence may be aligned with activity periods of a synchronization sequence and the second sections of the radio channel sequence may be aligned with non-activity periods of the synchronization sequence.

The radio channel sequence may be an E-RGCH mobile channel. The radio channel sequence may be an E-HICH mobile channel. The synchronization sequence may be an SCH mobile channel.

Each signature of the set of orthogonal signatures may be partitioned into a plurality of first sections and a plurality of second sections which plurality may be aligned with the plurality of first sections and the plurality of second sections of the radio channel sequence.

The method 600 may include providing a first matrix representation comprising the set of orthogonal signatures, for example the matrix S as described above with respect to FIG. 5.

The method 600 may include extending the first matrix representation to a second matrix representation by adding for each first section of the first signature a second matrix representation, the second matrix representation corresponding to the first matrix representation in which the respective first section is replaced by a unity matrix and the remaining part is replaced by zeros. The second matrix representation may correspond to the matrix S' as described above with respect to FIG. 5.

The method 600 may include providing the second signature based on an inverse of the second matrix representation, e.g. as described above with respect to FIG. 5.

The method 600 may include determining an estimate of the bias by correlating the radio channel sequence with the second signature. The method 600 may include temporally smoothing the estimate of the bias to reduce a variance of the estimate of the bias.

The method 600 may include correlating the radio channel sequence with the first signature to obtain a decoded symbol of the radio channel sequence; and subtracting the estimate of the bias from the decoded symbol of the radio channel sequence to provide a bias-cancelled decoded symbol of the radio channel sequence.

The method 600 may include subtracting the second signature from the first signature to provide a difference signature; and correlating the radio channel sequence with the difference signature to provide a bias-cancelled decoded symbol of the radio channel sequence.

Figure 7:
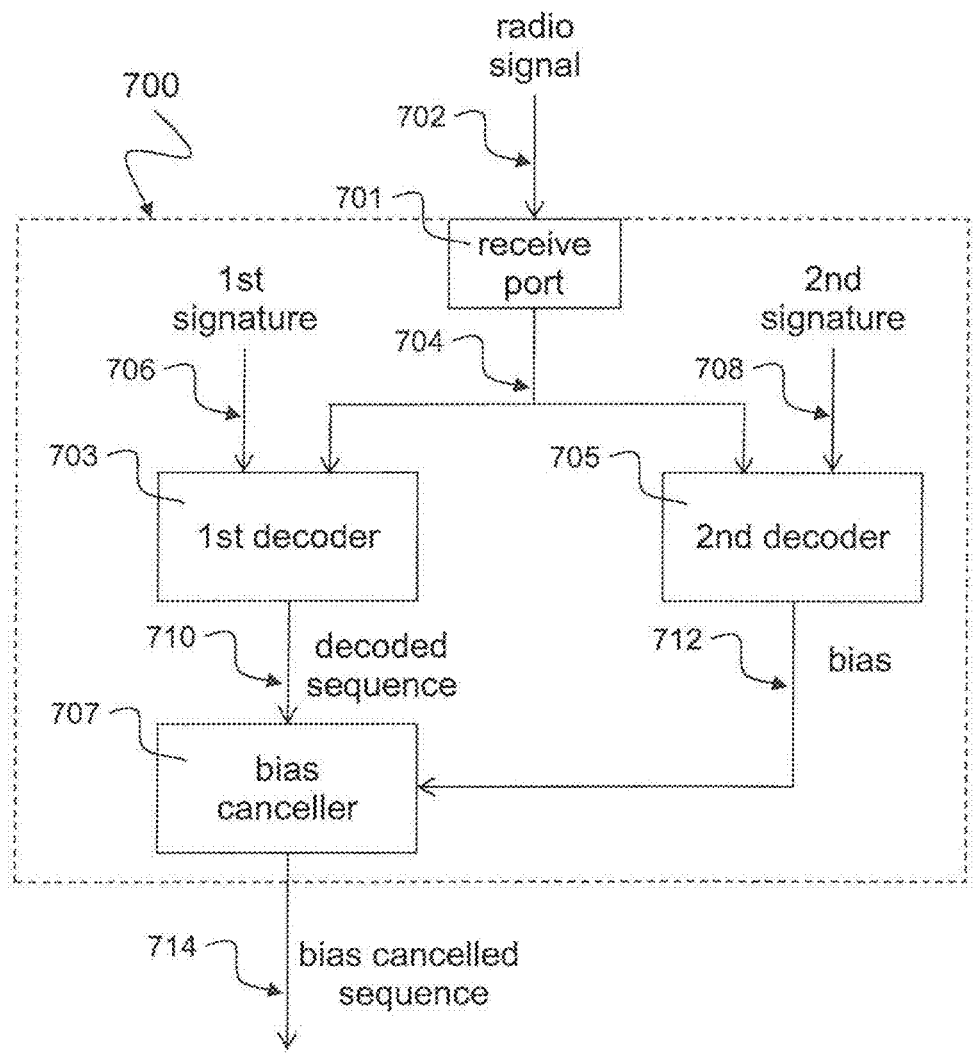
FIG. 7 is a schematic diagram of a device 700 of bias cancellation for a radio channel sequence in accordance with the disclosure.

FIG. 7 is a schematic diagram of a device 700 of bias cancellation for a radio channel sequence in accordance with the disclosure.

The device 700 includes a receive port 701 for receiving a radio signal 702. The radio signal includes a radio channel sequence 704 coded by a first signature 706, where the first signature 706 belongs to a set of orthogonal signatures, e.g. as described above with respect to FIGS. 3 and 4. The device 700 includes a first decoder 703 for decoding the radio channel sequence 704 based on the first signature 706 to generate a decoded radio channel sequence 710, e.g. as described above with respect to FIGS. 3 and 4. The device 700 includes a second decoder 705 for decoding the radio channel sequence 704 based on a second signature 708, which second signature 708 is orthogonal to the signatures of the set of orthogonal signatures, to generate a bias 712 of the radio channel sequence 704, e.g. as described above with respect to FIGS. 3, 4 and 5. The device 700 includes a bias canceler 707 for canceling the bias 712 of the radio channel sequence 704 from the decoded radio channel sequence 710, e.g. as described above with respect to FIGS. 2 to 6.

The device 700 may include a correlator, configured to correlate the radio channel sequence 704 with the first signature 706 to provide a value of the decoded radio channel sequence 710 and configured to correlate the radio channel sequence 704 with the second signature 708 to provide the bias 712 of the radio channel sequence 704, e.g. as described above with respect to FIGS. 2 to 6.

The device 700 may include an averaging unit, configured to timely smooth the bias 712 prior to bias cancellation, e.g. as described above with respect to FIGS. 3 to 5.

The device 700 may include a subtraction unit, configured to subtract the bias 712 of the radio channel sequence 704 from the decoded radio channel sequence 710 to provide a bias-cancelled decoded radio channel sequence 714, e.g. as described above with respect to FIGS. 2 to 6.

The device 700 may include a threshold detector, configured to detect a value of the decoded radio channel sequence 710 based on a threshold crossing of the bias-cancelled decoded radio channel sequence 714, e.g. as described above with respect to FIGS. 2 to 6.

The device 700 may include a processor, configured to determine the second signature 708 such that the second signature 708 comprises first sections 401 corresponding to respective first sections of the radio channel sequence, e.g. as described above with respect to FIG. 4 and that the second signature 708 comprises second sections 402 determined such that the second signature 708 is orthogonal to all signatures of the set of orthogonal signatures, e.g. as described above with respect to FIGS. 2 to 6.

The device 700 may include a memory, configured to store the second signature 708, the second signature 708 provided by the processor or provided by an off-line calculation unit, e.g. as described above with respect to FIGS. 2 to 6.

Figure 8A:
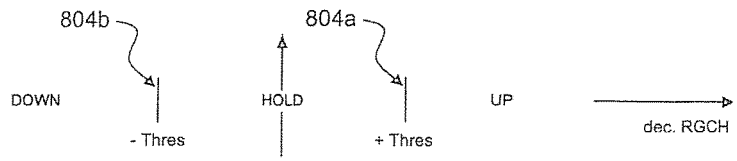
FIG. 8a is a signal level diagram of an RGCH signal.

FIG. 8a is a signal level diagram of an E-RGCH signal that may be used as received radio channel sequence in the methods 200 and 600 described above with respect to FIGS. 2 and 6. The E-RGCH for the serving cell can transmit three commands (UP/HOLD/DOWN). Therefore, two decision thresholds (−Thres, +Thres) 804b, 804a are required for the detection of this signal at the receiver.

The decision thresholds may be positioned symmetrically around zero as can be seen from FIG. 8a. The decision thresholds 804a, 804b may further be a function of the measured noise power. In a high SINR scenario, the noise power is relatively small leading to quite small thresholds 804a, 804b and a small detection area for the HOLD command as depicted in FIG. 8a.

Figure 8B:
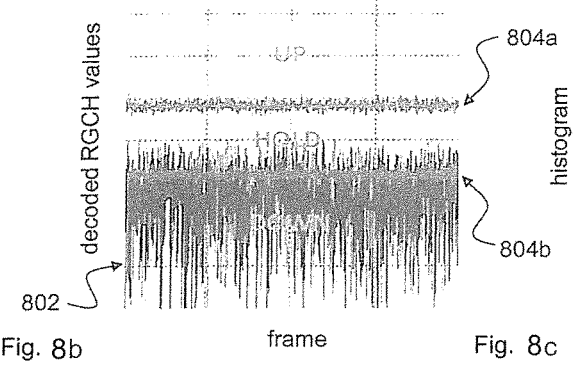
FIG. 8b is a schematic diagram of a decoded RGCH signal without bias cancellation.
Figure 8C:
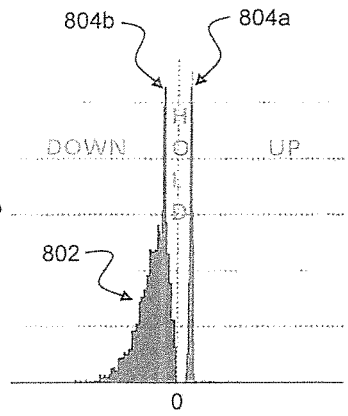
FIG. 8c is a histogram for the decoded RGCH signal without bias cancellation depicted in FIG. 8b.

FIG. 8b is a schematic diagram of a decoded RGCH signal without bias cancellation. FIG. 8c is a histogram for the decoded RGCH signal without bias cancellation depicted in FIG. 8b.

From FIGS. 8b and 8c one can see the negative impact of the SCH for E-DCH (Enhanced Dedicated Channel) DL (Downlink) reception in the mentioned high SINR scenario where especially the E-RGCH (E-DCH Relative Grant Channel) reception is affected. The function of the E-RGCH is either to increase, hold or decrease (ternary decision, UP/HOLD/DOWN) the uplink transmission rate based on scheduler decisions. The relative grants transmitted effectively control the allowed E-DPDCH (D-DCH Dedicated Physical Data Channel) gain factors and thus the E-DCH TX (Transmit) power to be used. In order to save downlink code space resources, one code channel is shared by multiple users and each user is allocated one orthogonal signature out of 40 available as the E-RGCH, and another one as the E-HICH (E-DCH Hybrid ARQ Indicator Channel). This allows the accommodation of up to 20 users with each having a dedicated E-RGCH and E-HICH on one single downlink code channel with spreading factor (SF) 128. The orthogonal signatures are one slot long and are extended to cover 2 ms subframes by applying three signatures in a sequence over three consecutive slots as shown in FIG. 8a.

As mentioned before, the magnitude of the SCH bias depends on a number of specific PHY parameters. In a worst case scenario, the bias can lead to PFA (Probability of False Alarm) values larger than 80%, i.e. although nothing (DTX) is transmitted, more than 80% of the RGCH commands are erroneously decoded in the receiver as UP or DOWN commands. Such a case is illustrated in FIGS. 8b and 8c.

In FIG. 8b, the decoded E-RGCH values 802 are depicted together with the decision thresholds 804a, 804b. Although nothing is transmitted in this case on the E-RGCH, most decoded E-RGCH values are smaller than the negative decision threshold 804b and erroneously detected as 'DOWN' in this case. In FIG. 8c, the respective histograms of decoded E-RGCH values and decision thresholds 804a, 804b are plotted. Here again the large negative SCH bias of the decoded E-RGCH values 802 is visible leading to a PFA of about 73% in this scenario.

In contrast to the E-RGCH detection without bias cancellation as depicted in FIGS. 8b and 8c, methods and devices as described in this disclosure estimate and cancel the potential SCH bias resulting in much better PFA scores. For the scenario above, the PFA reduces to only 2% as depicted in FIGS. 8d and 8e as described in the following.

Figure 8D:
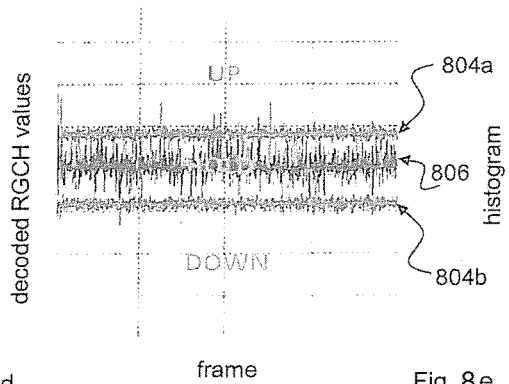
FIG. 8d is a schematic diagram of a decoded RGCH signal with bias cancellation in accordance with the disclosure.
Figure 8E:
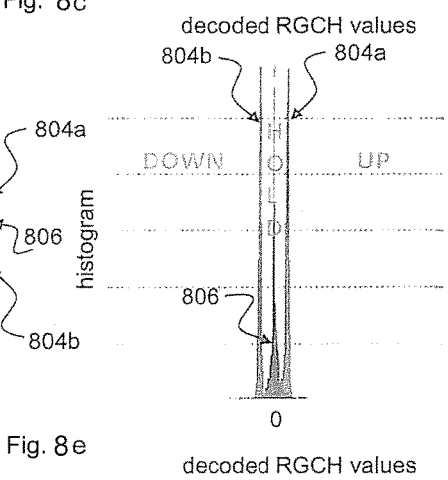
FIG. 8e is a histogram for the decoded RGCH signal with bias cancellation depicted in FIG. 8b in accordance with the disclosure.

FIG. 8*d* is a schematic diagram of a decoded RGCH signal with bias cancellation in accordance with the disclosure. FIG. 8*e* is a histogram for the decoded RGCH signal with bias cancellation depicted in FIG. 8*b* in accordance with the disclosure. The decoded RGCH signal 806 may be output of a method 200, 600 as described above with respect to FIGS. 2 and 6 or may correspond to the output signal 714 of a device 700 as described above with respect to FIG. 7.

It can be seen that the SCH bias is successfully removed resulting in a decoded E-RGCH signal 806 with almost zero mean. Depending on the E-RGCH power the probability of false detections (missed UPs/DOWNs) is also improved by applying bias cancellation as described in this disclosure.

In scenarios where the specific PHY parameter constellation (see above) does not result in an SCH bias, the methods and devices according to the disclosure do not perform noticeable worse than solutions without bias cancellation.

As a result, E-RGCH reception can be significantly improved by applying bias cancellation techniques according to the disclosure, especially in high SINR (cell center) scenarios.

The present disclosure also supports a computer program product including computer executable code or computer executable instructions that, when executed, causes at least one computer to execute the performing and computing steps described herein, in particular the methods 200 and 600 as described above with respect to FIGS. 2 and 6 and the techniques described above with respect to FIGS. 1 to 8. Such a computer program product may include a readable storage medium storing program code thereon for use by a computer. The program code may perform the method 200 as described above with respect to FIG. 2 or the method 600 as described above with respect to FIG. 6.

EXAMPLES

The following examples pertain to further embodiments. Example 1 is a method of bias cancellation for a radio channel sequence, the method comprising: receiving a radio signal, the radio signal comprising a radio channel sequence coded by a first signature, the first signature belonging to a set of orthogonal signatures; decoding the radio channel sequence based on the first signature to generate a decoded radio channel sequence; decoding the radio channel sequence based on a second signature, wherein the second signature is orthogonal to the signatures of the set of orthogonal signatures, to generate a bias of the radio channel sequence; and canceling the bias of the radio channel sequence from the decoded radio channel sequence.

In Example 2, the subject matter of Example 1 can optionally include that the second signature is different from all signatures of the set of orthogonal signatures.

In Example 3, the subject matter of any one of Examples 1-2 can optionally include that the second signature is different from signatures used for coding other radio channel sequences.

In Example 4, the subject matter of any one of Examples 1-3 can optionally include that the second signature has a same length as the first signature; and that the second signature has a same length as the radio channel sequence.

In Example 5, the subject matter of any one of Examples 1-4 can optionally include that the second signature comprises first sections corresponding to respective first sections of the radio channel sequence.

In Example 6, the subject matter of Example 5 can optionally include that the first sections of the second signature are periodically arranged in the second signature and have the same length.

In Example 7, the subject matter of any one of Examples 5-6 can optionally include that the second signature comprises second sections, wherein the second sections are determined for the second signature to be orthogonal to all signatures of the set of orthogonal signatures.

In Example 8, the subject matter of Example 7 can optionally include that the second sections of the second signature are periodically arranged in the second signature and have the same length.

In Example 9, the subject matter of any one of Examples 7-8 can optionally include that the second sections of the second signature are contiguous with the first sections of the second signature.

In Example 10, the subject matter of any one of Examples 7-9 can optionally include that the first sections of the second signature are aligned with activity periods of a synchronization sequence comprised by the radio signal; and that the second sections of the second signature are aligned with non-activity periods of the synchronization sequence.

Example 11 is a method for canceling a bias of a radio channel sequence coded by a first signature of a set of orthogonal signatures, the radio channel sequence comprising a plurality of first sections and a plurality of second sections, the method comprising: providing a second signature comprising a plurality of first sections and a plurality of second sections, wherein the plurality of first sections correspond to the plurality of first sections of the radio channel sequence and the plurality of second sections are determined for the second signature to be orthogonal to each first signature of the set of orthogonal signatures; and canceling the bias of the radio channel sequence based on the second signature.

In Example 12, the subject matter of Example 11 can optionally include that the first sections of the radio channel sequence are aligned with activity periods of a synchronization sequence and the second sections of the radio channel sequence are aligned with non-activity periods of the synchronization sequence.

In Example 13, the subject matter of Example 12 can optionally include that the radio channel sequence is one of an E-RGCH and an E-HICH mobile channel and; that the synchronization sequence is an SCH mobile channel.

In Example 14, the subject matter of any one of Examples 11-13 can optionally include that each signature of the set of orthogonal signatures is partitioned into a plurality of first sections and a plurality of second sections wherein the plurality of the first and second sections are aligned with the plurality of first sections and the plurality of second sections of the radio channel sequence.

In Example 15, the subject matter of Example 14 can optionally include providing a first matrix representation comprising the set of orthogonal signatures; extending the first matrix representation to a second matrix representation by adding for each first section of the first signature a second matrix representation, the second matrix representation corresponding to the first matrix representation in which the respective first section is replaced by a unity matrix and the remaining part is replaced by zeros; and providing the second signature based on an inverse of the second matrix representation.

In Example 16, the subject matter of any one of Examples 11-15 can optionally include determining an estimate of the bias by correlating the radio channel sequence with the second signature.

In Example 17 the subject matter of Example 16 can optionally include temporally smoothing the estimate of the bias to reduce a variance of the estimate of the bias.

In Example 18, the subject matter of any one of Examples 16-17 can optionally include correlating the radio channel sequence with the first signature to generate a decoded symbol of the radio channel sequence; and subtracting the estimate of the bias from the decoded symbol of the radio channel sequence to provide a bias-cancelled decoded symbol of the radio channel sequence.

In Example 19, the subject matter of any one of Examples 11-15 can optionally include subtracting the second signature from the first signature to provide a difference signature; and correlating the radio channel sequence with the difference signature to provide a bias-cancelled decoded symbol of the radio channel sequence.

Example 20 is a device for canceling a bias of a radio channel sequence, the device comprising: a receive port for receiving a radio signal, the radio signal comprising a radio channel sequence coded by a first signature, the first signature belonging to a set of orthogonal signatures; a first decoder for decoding the radio channel sequence based on the first signature to generate a decoded radio channel sequence; a second decoder for decoding the radio channel sequence based on a second signature, which second signature is orthogonal to the signatures of the set of orthogonal signatures, to generate a bias of the radio channel sequence; and a bias canceller for canceling the bias of the radio channel sequence from the decoded radio channel sequence.

In Example 21, the subject matter of Example 20 can optionally include a correlator, configured to correlate the radio channel sequence with the first signature to provide a value of the decoded radio channel sequence and configured to correlate the radio channel sequence with the second signature to provide the bias of the radio channel sequence.

In Example 22, the subject matter of any one of Examples 19-20 can optionally include an averaging unit, configured to timely smooth the bias prior to bias cancellation.

In Example 23, the subject matter of any one of Examples 20-22 can optionally include a subtraction unit, configured to subtract the bias of the radio channel sequence from the decoded radio channel sequence to provide a bias-cancelled decoded radio channel sequence; and a threshold detector, configured to detect a value of the decoded radio channel sequence based on a threshold crossing of the bias-cancelled decoded radio channel sequence.

In Example 24, the subject matter of any one of Examples 20-23 can optionally include a processor, configured to determine the second signature such that the second signature comprises first sections corresponding to respective first sections of the radio channel sequence and that the second signature comprises second sections determined such that the second signature is orthogonal to all signatures of the set of orthogonal signatures.

In Example 25, the subject matter of Example 24 can optionally include a memory, configured to store the second signature, the second signature provided by the processor or provided by an off-line calculation unit.

Example 26 is a computer readable medium on which computer instructions are stored which when executed by a computer, cause the computer to perform the method of one of Examples 1 to 19.

In Example 27, the subject matter of Example 11 can optionally include that the second signature is different from all signatures of the set of orthogonal signatures.

In Example 28, the subject matter of Example 11 can optionally include that the second signature is different from signatures used for coding other radio channel sequences.

In Example 29, the subject matter of Example 11 can optionally include that the second signature has a same length than the first signature; and that the second signature has a same length than the radio channel sequence.

In Example 30, the subject matter of Example 11 can optionally include that the second signature comprises first sections corresponding to respective first sections of the radio channel sequence.

In Example 31, the subject matter of Example 11 can optionally include that the first sections of the second signature are periodically arranged in the second signature and have the same length.

In Example 32, the subject matter of Example 11 can optionally include that the second signature comprises second sections, the second sections determined such that the second signature is orthogonal to all signatures of the set of orthogonal signatures.

In Example 33, the subject matter of Example 11 can optionally include that the second sections of the second signature are periodically arranged in the second signature and have the same length.

In Example 34, the subject matter of Example 11 can optionally include that the second sections of the second signature are contiguous with the first sections of the second signature.

In Example 35, the subject matter of Example 11 can optionally include that the first sections of the second signature are aligned with activity periods of a synchronization sequence comprised by the radio signal; and that the second sections of the second signature are aligned with non-activity periods of the synchronization sequence.

In Example 36, the subject matter of Example 1 can optionally include that first sections of the radio channel sequence are aligned with activity periods of a synchronization sequence and second sections of the radio channel sequence are aligned with non-activity periods of the synchronization sequence.

In Example 37, the subject matter of Example 36 can optionally include that the radio channel sequence is one of an E-RGCH and an E-HICH mobile channel and; that the synchronization sequence is an SCH mobile channel.

In Example 38, the subject matter of Example 1 can optionally include that each signature of the set of orthogonal signatures is partitioned into a plurality of first sections and a plurality of second sections which plurality is aligned with the plurality of first sections and the plurality of second sections of the radio channel sequence.

In Example 39, the subject matter of Example 38 can optionally include providing a first matrix representation comprising the set of orthogonal signatures; extending the first matrix representation to a second matrix representation by adding for each first section of the first signature a second matrix representation, the second matrix representation corresponding to the first matrix representation in which the respective first section is replaced by a unity matrix and the remaining part is replaced by zeros; and providing the second signature based on an inverse of the second matrix representation.

In Example 40, the subject matter of Example 1 can optionally include determining an estimate of the bias by correlating the radio channel sequence with the second signature.

In Example 41 the subject matter of Example 40 can optionally include temporally smoothing the estimate of the bias to reduce a variance of the estimate of the bias.

In Example 42, the subject matter of Examples 40 can optionally include correlating the radio channel sequence with the first signature to generate a decoded symbol of the radio channel sequence; and subtracting the estimate of the bias from the decoded symbol of the radio channel sequence to provide a bias-cancelled decoded symbol of the radio channel sequence.

In Example 43, the subject matter of Example 1 can optionally include subtracting the second signature from the first signature to provide a difference signature; and correlating the radio channel sequence with the difference signature to provide a bias-cancelled decoded symbol of the radio channel sequence.

Example 44 is a bias cancellation device for a radio channel sequence, the device comprising: receiving means for receiving a radio signal, the radio signal comprising a radio channel sequence coded by a first signature, the first signature belonging to a set of orthogonal signatures; decoding means for decoding the radio channel sequence based on the first signature to obtain a decoded radio channel sequence; decoding means for decoding the radio channel sequence based on a second signature, which second signature is orthogonal to the signatures of the set of orthogonal signatures, to obtain a bias of the radio channel sequence; and canceling means for canceling the bias of the radio channel sequence from the decoded radio channel sequence.

In Example 45, the subject matter of Example 44 can optionally include that the second signature is different from all signatures of the set of orthogonal signatures.

Example 46 is device for canceling a bias of a radio channel sequence coded by a first signature of a set of orthogonal signatures, the radio channel sequence comprising a plurality of first sections and a plurality of second sections, the device comprising: providing means for providing a second signature comprising a plurality of first sections and a plurality of second sections, wherein the first sections of the second signature correspond to the first sections of the radio channel sequence and the second sections of the second signature are determined such that the second signature is orthogonal to each first signature of the set of orthogonal signatures; and canceling means for canceling the bias of the radio channel sequence based on the second signature.

In Example 47, the subject matter of Example 46 can optionally include that the first sections of the radio channel sequence are aligned with activity periods of a synchronization sequence and the second sections of the radio channel sequence are aligned with non-activity periods of the synchronization sequence.

Example 48 is a system for canceling a bias of a radio channel sequence, the system comprising: a receive port for receiving a radio signal, the radio signal comprising a radio channel sequence coded by a first signature, the first signature belonging to a set of orthogonal signatures; a first decoder for decoding the radio channel sequence based on the first signature to obtain a decoded radio channel sequence; a second decoder for decoding the radio channel sequence based on a second signature, which second signature is orthogonal to the signatures of the set of orthogonal signatures, to obtain a bias of the radio channel sequence; and a bias canceler for canceling the bias of the radio channel sequence from the decoded radio channel sequence.

In Example 49, the subject matter of Example 48 can optionally include a correlator, configured to correlate the radio channel sequence with the first signature to provide a value of the decoded radio channel sequence and configured to correlate the radio channel sequence with the second signature to provide the bias of the radio channel sequence.

In Example 50, the subject matter of any one of Examples 48-49 can optionally include an averaging unit, configured to timely smooth the bias prior to bias cancellation.

In Example 51, the subject matter of any one of Examples 48-50 can optionally include a subtraction unit, configured to subtract the bias of the radio channel sequence from the decoded radio channel sequence to provide a bias-cancelled decoded radio channel sequence; and a threshold detector, configured to detect a value of the decoded radio channel sequence based on a threshold crossing of the bias-cancelled decoded radio channel sequence.

In Example 52, the subject matter of any one of Examples 48-51 can optionally include a processor, configured to determine the second signature such that the second signature comprises first sections corresponding to respective first sections of the radio channel sequence and that the second signature comprises second sections determined such that the second signature is orthogonal to all signatures of the set of orthogonal signatures.

In Example 53, the subject matter of Example 52 can optionally include a memory, configured to store the second signature, the second signature provided by the processor or provided by an off-line calculation unit.

In Example 54, the subject matter of any one of Examples 48-53 can optionally include that the system is an on-chip system.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

What is claimed is:

1. A method of bias cancellation for a radio channel sequence, the method comprising:
   receiving a radio signal, the radio signal comprising a radio channel sequence coded by a first signature, the first signature belonging to a set of orthogonal signatures;
   decoding the radio channel sequence based on the first signature to obtain a decoded radio channel sequence;

decoding the radio channel sequence based on a second signature to obtain a bias of the radio channel sequence, wherein the bias is caused by a synchronization signal, the second signature comprising first sections and second sections, the first sections of the second signature corresponding to respective first sections of the radio channel sequence, the first sections of the second signature being aligned with activity periods of a synchronization sequence comprised by the radio signal, the second sections of the second signature being determined such that the second signature is orthogonal to all signatures of the set of orthogonal signatures, and the second sections of the second signature being aligned with non-activity periods of the synchronization sequence; and canceling the bias of the radio channel sequence from the decoded radio channel sequence.

2. The method of claim 1,
wherein the second signature is different from all signatures of the set of orthogonal signatures.

3. The method of claim 1,
wherein the second signature is different from signatures used for coding other radio channel sequences.

4. The method of claim 1,
wherein the second signature has a same length than the first signature; and
wherein the second signature has a same length than the radio channel sequence.

5. The method of claim 1,
wherein the first sections of the second signature are periodically arranged in the second signature and have the same length.

6. The method of claim 1,
wherein the second sections of the second signature are periodically arranged in the second signature and have the same length.

7. The method of claim 1,
wherein the second sections of the second signature are contiguous with the first sections of the second signature.

8. A method for canceling a bias of a radio channel sequence coded by a first signature of a set of orthogonal signatures, the radio channel sequence comprising a plurality of first sections and a plurality of second sections, the method comprising:

providing a second signature comprising a plurality of first sections and a plurality of second sections, wherein the first sections of the second signature correspond to the first sections of the radio channel sequence, the second sections of the second signature are determined such that the second signature is orthogonal to each first signature of the set of orthogonal signatures, the first sections of the radio channel sequence are aligned with activity periods of a synchronization sequence, and the second sections of the radio channel sequence are aligned with non-activity periods of the synchronization sequence; and canceling the bias of the radio channel sequence based on the second signature, wherein the bias is due to a synchronization signal.

9. The method of claim 8,
wherein the radio channel sequence is one of an E-RGCH and an E-HICH mobile channel and;
wherein the synchronization sequence is an SCH mobile channel.

10. The method of claim 8, comprising:
determining an estimate of the bias by correlating the radio channel sequence with the second signature.

11. The method of claim 10, comprising:
temporally smoothing the estimate of the bias to reduce a variance of the estimate of the bias.

12. The method of claim 10, comprising:
correlating the radio channel sequence with the first signature to obtain a decoded symbol of the radio channel sequence; and
subtracting the estimate of the bias from the decoded symbol of the radio channel sequence to provide a bias-cancelled decoded symbol of the radio channel sequence.

13. A method for canceling a bias of a radio channel sequence coded by a first signature of a set of orthogonal signatures, the radio channel sequence comprising a plurality of first sections and a plurality of second sections, the method comprising:

providing a second signature comprising a plurality of first sections and a plurality of second sections, wherein the first sections of the second signature correspond to the first sections of the radio channel sequence and the second sections of the second signature are determined such that the second signature is orthogonal to each first signature of the set of orthogonal signatures, wherein each signature of the set of orthogonal signatures is partitioned into a plurality of first sections and a plurality of second sections, wherein the plurality of first sections and the plurality of second sections of the partitioned signature is aligned with the plurality of first sections and the plurality of second sections of the radio channel sequence;

canceling the bias of the radio channel sequence based on the second signature, wherein the bias is due to a synchronization signal;

providing a first matrix representation comprising the set of orthogonal signatures;

extending the first matrix representation to a second matrix representation by adding for each first section of the first signature a second matrix representation, the second matrix representation corresponding to the first matrix representation in which the respective first section is replaced by a unity matrix and the remaining part is replaced by zeros; and providing the second signature based on an inverse of the second matrix representation.

14. A method for canceling a bias of a radio channel sequence coded by a first signature of a set of orthogonal signatures, the radio channel sequence comprising a plurality of first sections and a plurality of second sections, the method comprising:

providing a second signature comprising a plurality of first sections and a plurality of second sections, wherein the first sections of the second signature correspond to the first sections of the radio channel sequence and the second sections of the second signature are determined such that the second signature is orthogonal to each first signature of the set of orthogonal signatures;

canceling the bias of the radio channel sequence based on the second signature, wherein the bias is due to a synchronization signal;

subtracting the second signature from the first signature to provide a difference signature; and correlating the radio channel sequence with the difference signature to provide a bias-cancelled decoded symbol of the radio channel sequence.

15. A device for canceling a bias of a radio channel sequence, the device comprising:
- a receive port for receiving a radio signal, the radio signal comprising a radio channel sequence coded by a first signature, the first signature belonging to a set of orthogonal signatures;
- a first decoder for decoding the radio channel sequence based on the first signature to obtain a decoded radio channel sequence;
- a second decoder for decoding the radio channel sequence based on a second signature to obtain a bias of the radio channel sequence, wherein the bias is caused by a synchronization signal, the second signature comprising first sections and second sections, the first sections of the second signature corresponding to respective first sections of the radio channel sequence, the first sections of the second signature being aligned with activity periods of a synchronization sequence comprised by the radio signal, the second sections of the second signature being determined such that the second signature is orthogonal to all signatures of the set of orthogonal signatures, and the second sections of the second signature being aligned with non-activity periods of the synchronization sequence; and
- a bias canceller for canceling the bias of the radio channel sequence from the decoded radio channel sequence.

16. The device of claim 15, further comprising:
- a correlator, configured to correlate the radio channel sequence with the first signature to provide a value of the decoded radio channel sequence and configured to correlate the radio channel sequence with the second signature to provide the bias of the radio channel sequence.

17. The device of claim 15, further comprising:
an averaging unit, configured to timely smooth the bias prior to bias cancellation.

18. The device of claim 15, further comprising:
- a subtraction unit, configured to subtract the bias of the radio channel sequence from the decoded radio channel sequence to provide a bias-cancelled decoded radio channel sequence; and
- a threshold detector, configured to detect a value of the decoded radio channel sequence based on a threshold crossing of the bias-cancelled decoded radio channel sequence.

19. The device of claim 15, further comprising:
a processor, configured to determine the second signature.

20. The device of claim 19, further comprising:
a memory, configured to store the second signature, the second signature provided by the processor or provided by an off-line calculation unit.

* * * * *